(12) United States Patent
Martinsson et al.

(10) Patent No.: US 8,740,529 B2
(45) Date of Patent: Jun. 3, 2014

(54) ATTACHING ARRANGEMENT FOR HAND-HELD MOTOR-DRIVEN TOOLS

(75) Inventors: Par Martinsson, Jonkoping (SE); Dag Edlund, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 363 days.

(21) Appl. No.: 12/758,290

(22) Filed: Apr. 12, 2010

(65) Prior Publication Data

US 2010/0232904 A1    Sep. 16, 2010

Related U.S. Application Data

(63) Continuation-in-part of application No. PCT/SE2007/000895, filed on Oct. 12, 2007.

(51) Int. Cl.
*F16B 21/18* (2006.01)

(52) U.S. Cl.
USPC ............... 411/353; 411/134; 30/383; 30/386

(58) Field of Classification Search
USPC ............... 411/353, 103, 105, 119, 120, 134, 411/186–189, 84, 87, 101, 172–177; 30/381, 383, 386
See application file for complete search history.

(56) References Cited

U.S. PATENT DOCUMENTS

| | | | | |
|---|---|---|---|---|
| 3,426,817 A * | 2/1969 | Andrews et al. | ............ | 411/173 |
| 3,611,864 A * | 10/1971 | Buckley | ............ | 411/85 |
| 4,219,064 A * | 8/1980 | Lozano | ............ | 411/103 |
| 5,039,264 A * | 8/1991 | Benn | ............ | 411/175 |
| 5,326,206 A * | 7/1994 | Moore | ............ | 411/113 |
| 5,497,557 A | 3/1996 | Martinsson | | |
| 6,095,734 A * | 8/2000 | Postadan et al. | ............ | 411/182 |
| 6,564,459 B1 * | 5/2003 | Steinbrueck et al. | ............ | 30/383 |
| 6,688,825 B1 * | 2/2004 | Stewart et al. | ............ | 411/174 |
| 6,782,627 B2 * | 8/2004 | Hermes et al. | ............ | 30/386 |
| 6,805,524 B2 * | 10/2004 | Kanie et al. | ............ | 411/174 |
| 7,743,513 B1 | 6/2010 | Fisher et al. | | |

(Continued)

FOREIGN PATENT DOCUMENTS

| | | |
|---|---|---|
| DE | 29909645 U1 | 10/1999 |
| GB | 2368039 A | 4/2002 |
| WO | 2009/048356 A1 | 4/2009 |

OTHER PUBLICATIONS

International Search Report for International Application No. PCT/SE2007/000895; dated Jun. 10, 2008; 4 pages.
International Preliminary Report on Patentability for International Application No. PCT/SE2007/000895; dated Dec. 14, 2009; 9 pages.

(Continued)

*Primary Examiner* — Gary Estremsky
(74) *Attorney, Agent, or Firm* — Novak Druce Connolly Bove + Quigg LLP

(57) ABSTRACT

An arrangement for attaching a bar of a hand-held motor driven tool, such as a chain saw, to a body of the tool includes at least one first engagement device, a cover portion adapted to bear against a bar such that the bar is arranged between the cover portion and the body, and at least one second engagement device is adapted to engage the first engagement device for securing a bar between the cover portion and the body. The second engagement device is arranged to move a first distance along the first engagement device in a direction of the rotation axis of the second engagement device for securing a bar between the cover portion and the body. The second engagement device is captively attached to a spring biasing member having an undistorted position and a distorted position.

17 Claims, 4 Drawing Sheets

(56) References Cited

U.S. PATENT DOCUMENTS

| | | | |
|---|---|---|---|
| 8,132,484 B2* | 3/2012 | Pfleiderer et al. | 74/606 R |
| 2001/0042311 A1 | 11/2001 | Kondo et al. | |
| 2005/0169727 A1* | 8/2005 | Cosenza | 411/120 |
| 2008/0034597 A1* | 2/2008 | Pfleiderer et al. | 30/382 |
| 2010/0236756 A1* | 9/2010 | Yang | 165/80.3 |
| 2011/0232110 A1 | 9/2011 | Wolf et al. | |

OTHER PUBLICATIONS

Written Opinion of the International Searching Authority for International Application No. PCT/SE2007/000895; dated Jun. 10, 2008; 8 pages.

Non-Final Office Action for related U.S. Appl. No. 12/682,765, mailed Feb. 22, 2013.

* cited by examiner

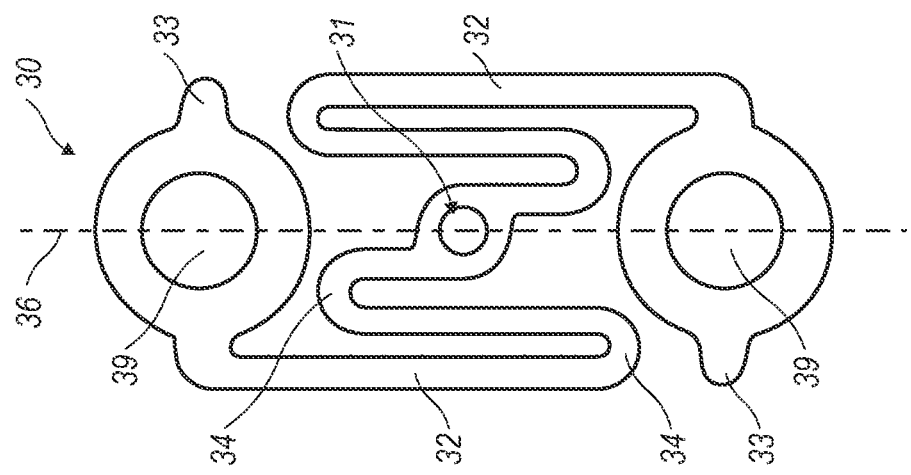
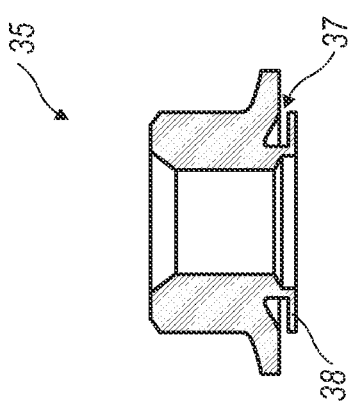
FIG. 5B
FIG. 5A

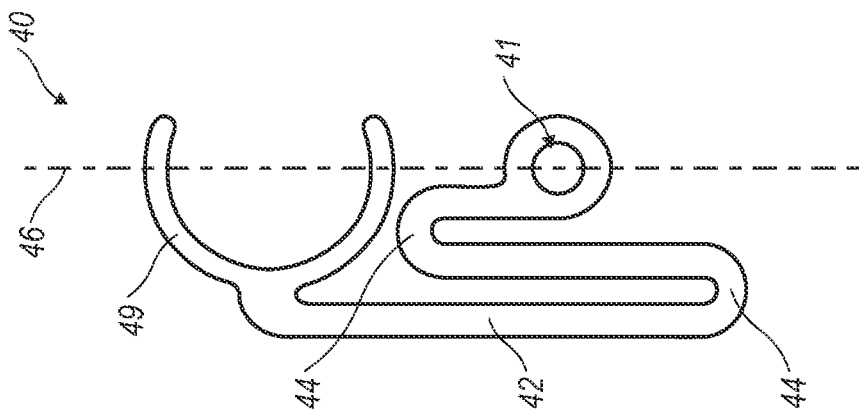
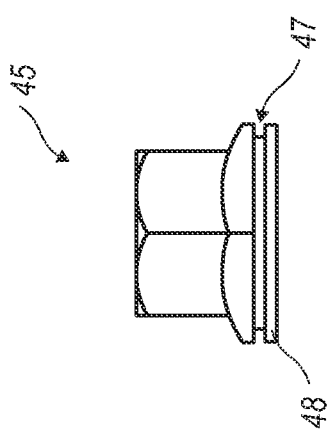
FIG. 6B
FIG. 6A

ATTACHING ARRANGEMENT FOR HAND-HELD MOTOR-DRIVEN TOOLS

CROSS-REFERENCE TO RELATED APPLICATIONS

The present application is a continuation-in-part of International Application No. PCT/SE2007/000895 which was filed 12 Oct. 2007 in English, said application is expressly incorporated by reference in its entirety.

TECHNICAL FIELD

The present disclosure deals with attaching arrangements for hand-held motor-driven tools, such as chain saws. For example one arrangement is disclosed for attaching a bar of such a hand-held motor-driven tool to a body of the tool.

BACKGROUND

A conventional chain saw includes a body and a guide bar that supports the saw chain. A cover clamps the guide bar to the body by means of a tightening arrangement, comprising a bar bolt and a nut. For some reasons, e.g. for changing bars or if the chain has come off, the cover may have to be detached from the body. Before the cover can be detached, the tightening arrangement has to be loosened such that the nut is detached from the bar bolt.

A problem with conventional tightening arrangements, where the nut is loose when detached from the bar bolt, is that an operator of the tool might lose the nut when detaching the cover from the body, especially if situated in a forest. The operator often puts the nut on the ground after detaching it from the bar bolt, and since the ground is usually covered by brushwood and scrub, finding the nut again might be difficult.

An arrangement where the nut is disposed in the interior of the cover, and consequently can't be lost when detaching the cover, is disclosed in US2001/0042311. A disadvantage with this arrangement is that the cover can not be pressed towards the body in order to hold the guide bar in position before starting to thread the nut and the bolt, since the nut will bear against the bolt before the cover bears against the guide bar. Instead the operator has to hold the guide bar in position with one hand while threading the nut with the other hand, which makes the attaching operation complicated.

For large chain saws, having long guide bars, the guide bar tightening arrangement is exposed to greater strain and two bar bolts with corresponding nuts are generally used in order to strengthen the mounting. An arrangement having two bar bolts is disclosed in U.S. Pat. No. 5,497,557. In a chain saw having more than one bar bolt, the arrangement described in US2001/0042311 is not convenient since it would not allow loosening the nuts one at a time. Instead the operator has to unthread the nuts alternately, which makes the detaching of the cover from the body a bit tedious.

There are also other reasons for the operator to detach the cover, not only for the purpose of changing bar or changing chain. For instance, the operator is doing a weekly overhaul that might include inspection of break components and inspection of the centrifugal clutch. The cover needs to be detached during such inspections. A further reason for detaching the cover is for getting access to and cleaning the grove or hole in the bar which provides the chain with chain oil. The groove or hole might become clogged by dirt during long term use in severe operating conditions and is sometimes in need of cleaning.

BRIEF DESCRIPTION OF THE DRAWINGS

The disclosure will in the following be described in more detail with reference to the enclosed drawings, wherein:

FIG. 5A is cross sectional view of a second engagement device of the chain saw according to an alternative embodiment of the present disclosure;

FIG. 5B is a top view of a spring biasing member corresponding to the second engagement device illustrated in FIG. 5A;

FIG. 6A is a side view of a second engagement device in accordance to another alternative embodiment of the present disclosure; and FIG. 6B is a top view of a spring biasing member corresponding to the second engagement device illustrated in FIG. 6A.

DESCRIPTION OF EMBODIMENTS

Figure 1:
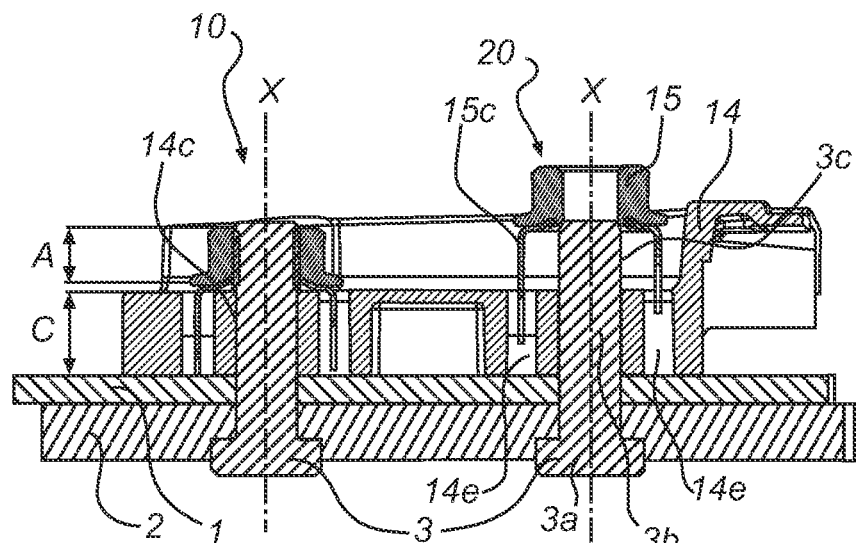
FIGS. 1 and 2 are cross sectional views of a part of a chain saw including a first embodiment of the present disclosure.

The present disclosure will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In the drawings, like numbers refer to like elements.

Exemplary embodiments of attaching arrangements for hand-held motor-driven tools will be described with reference to FIGS. 1-6. While the below described can be implemented with a variety of attachment mechanisms the illustrated embodiments are described in relation to a chain saw having a body and a chain guiding bar that in a conventional manner supports and guides a saw chain in a peripheral groove of the bar. The saw chain is driven by a sprocket wheel, hidden under a cover portion. The body is provided with an engine that via a driving arrangement drives the sprocket wheel. The guide bar extends forwardly in the longitudinal direction of the chain saw, and the rearward end of the bar is clamped between the body and the cover portion by means of a tightening arrangement. Other types of arrangements that are within the scope of this disclosure include devices that require the use of secured engagement mechanisms for releasably affixing a first part to a second part of the device. For example this can be cover for a saw, a rotary drill, line trimmer, concrete saw or the like. The present disclosure enables an engagement mechanism to be affixed to the part of interest after being releasable.

Figure 2:
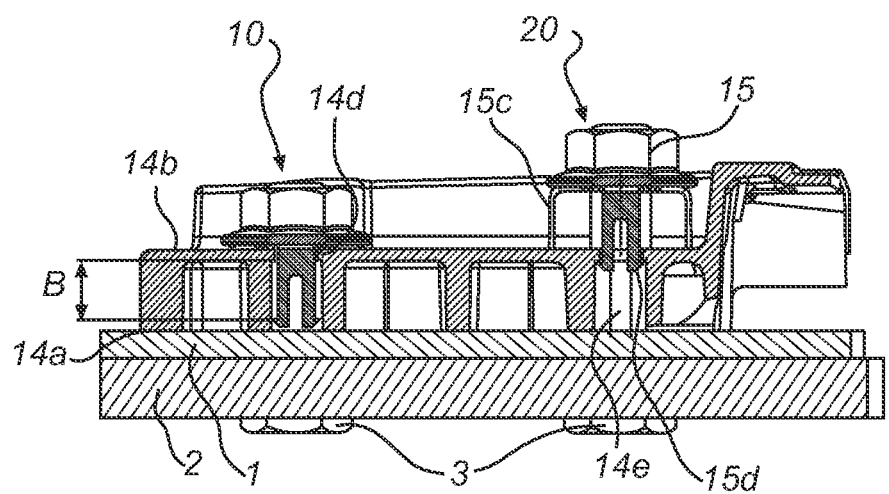
Figure 3:
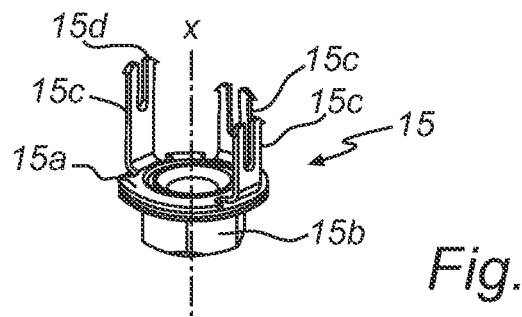
FIG. 3 is a perspective view of a nut according to the first embodiment of the present disclosure.

A first embodiment is shown in FIGS. 1-3. A cover portion 14 clamps a guide bar 1 to a body 2 by means of a tightening arrangement, comprising two joints 10, 20. Each joint includes a first 3 and a second 15 engagement device. The first engagement device 3 is a bolt and the second engagement device 15 is a nut. While the first and second engagement device as illustrated herein is shown as a bolt and nut, one of skill in the art would understand that other types of engagement devices can be used for example a stud and nut, a snap fit engagement, other threaded engagement devices, and the like.

Each bolt 3 has a first part 3a and a second part 3b. The first part 3a is securely attached to the body 2, e.g. by force fit, and the second part 3b extends from the body in a direction perpendicular to the guide bar plane and further through an aperture in the guide bar 1 and through an aperture 14c in the cover portion 14. The cover portion 14 has an inner surface 14a, directed towards the body 2, and an outer surface 14b, directed away from the body. A threaded part 3c of the second bolt part 3b, functioning as an engagement portion for engaging the nut to the bolt, projects at least partly beyond the outer surface 14b of the cover portion. In order to clamp the bar 1 between the cover portion 14 and the body 2, the nut 15 is engaged to the threaded part 3c of the bolt 3, and tightened.

The joint 20 in the right part of FIGS. 1 and 2 illustrates a condition when the nut 15 and the bolt 3 are not engaged but the nut is captively connected to the holder portion 14.

The joint 10 in the left part of FIGS. 1 and 2 illustrates a condition when the nut 3 and the bolt 15 are engaged and the nut 15 is tightened such that the joint clamps the bar 1 firmly between the body 2 and the cover portion 14.

In FIG. 2, reference A indicates a first distance, which is the length of threaded engagement between the bolt 3 and the nut 15, i.e. the distance in the direction of a nut rotation axis X that the nut 15 has to move in threaded engagement with the bolt 3 for firmly clamping the bar 1 between the body 2 and the cover portion 14. When the nut is not engaged to the bolt, the nut can move a second distance B relative the cover portion 14, in the direction of the nut rotation axis X. In FIG. 2, this second distance B is equal to the distance in the direction of the nut rotation axis X between the position of the nut 15 in the left part of the figure and the position of the nut 15 in the right part of the figure. The second distance B is equal to or greater than the first distance A, for allowing the nuts 15 to be loosened separately and independently of each other when detaching the cover from the body.

The nut 15 comprises a hollow and internally threaded body portion 15b, which is rotatably attached to a holder portion 15a, as shown in FIG. 3. The body portion 15b is rotatable compared to the holder portion 15a around the nut rotation axis X.

The holder portion 15a comprises a substantially circular portion that bears against the body portion 15b, and three attaching portions 15c, formed as legs, extending from the periphery of the substantially circular portion. The legs 15c are flat and directed away from the body portion 15b in a direction substantially parallel to the nut rotation axis X.

For each leg 15c a slot extends from an end of each leg distal to the body portion in a direction towards the body portion 15b to a point between the distal end of the leg 15c and the substantially circular portion of the holder portion 15a, such that the slot partly divides each leg 15c into two parallel parts. Each parallel part has a protruding portion 15d, shaped as a hook, in the distal end.

The cover portion 14 has oblong recesses 14e for receiving the legs 15c of the nut holder portion 15a. There is one separate recess 14e for each leg 15c. The recesses 14e are arranged separately from the through aperture 14c of the cover portion, which aperture 14c is arranged for receiving the bolt 3. The outer surface 14b of the cover portion 14 has protruding portions 14d arranged to co-operate with the hooks 15d of the nut holder portion legs 15c. The distance between these protruding portions 14d make the width of an opening of the recess 14e smaller than the width of the nut holder portion leg 15c at the position of the hooks 15d, such that the holder portion legs 15c are captivated within the recess 14e. The depth of each recess 14e is equal to or larger than the length of a holder portion leg 14c. The recesses 14e may according to an alternative embodiment extend from the outer surface 14a to the inner surface 14b of the body, e.g. the recesses may be through apertures.

The slots of each leg 15c make the structure of the nut holder portion legs 15c resilient. The outer ends of the two parallel parts can be pressed towards each other so that it is possible to snap the legs into the openings of the recesses 14e in the cover portion. Once inserted into the recesses, the legs 15c will revert to their original shape. The legs 15c allow the nut 15 to move relative the cover portion 14 in a direction of the rotational axis X of the nut. When the hooks 15d of the legs reaches the protruding portions 14d of the cover portion 14, the protruding portions 14d will co-operate with the hooks 15d such that the movement of the nut 15 is stopped. In this way, the nut 15 is captively attached to the cover portion 14.

In FIGS. 1-3, the nut holder portion 15a has three legs 15c and there are three recesses 14e in the cover portion 14 for receiving the legs 15c. The number of legs 15c and corresponding recesses 14e may also be one, two, four or more.

The cross section in FIG. 1 is taken along a plane that intersects the centers of the bolts 3. The cross section in FIG. 2 is taken along a plane that is parallel to the cross section plane in FIG. 1 and that intersects a leg 15c of the nut holder portion 15a.

If an operator of a tool would like to e.g. change bars 1 using the arrangement described in FIGS. 1-3, the operator starts by loosening the nuts 15. As the second distance B is larger than the first distance A, the length of threaded engagement, the nuts 15 can be unscrewed and loosened one at a time. When the nuts are loose, the cover 14 including the nuts 15 captively arranged in the cover is removed from the chain saw. Thereafter, the operator removes the old bar 1 from the body 2 and the bolts 3 of the tightening arrangement, and arranges a new bar 1 onto the bolts 3 such that the second part 3b of the bolts passes through the apertures of the new bar 1.

When the new bar 1 has been arranged onto the bolts 3, the cover portion 14 is arranged onto the bolts 3 by leading the bolts through the through apertures 14c of the cover portion. The through apertures 14c of the cover portion also function as a guiding means for guiding the cover portion 14 onto the bolts 3 such that the cover portion 14 comes into a correct position and such that the nuts 15 are arranged correctly towards the end of the second parts 3b of the bolts. In chain saw configurations having break components, such as a break band for a kick-back guard (not shown), mounted in the cover portion it is important to obtain high precision in the position of the cover portion 14. As the cover portion 14 is mounted onto the bolts 3 of body 2 the through aperture 14c of the cover portion 14 gets guidance from the second part 3b of the bolt 3. The diameters of the second part 3b of the bolt 3 and the through aperture 14c are preferably adapted to achieve a close fit and thereby a sufficient guidance in order to obtain a high precision in the position of the cover portion 4. According to the present embodiment the precision in the position of the cover portion 14 is even further improved by the relatively long contact area, defined by the distance C in FIG. 1.

As the nuts 15 are captively attached to the cover portion 14 in such a way that they are movable a second distance B relative the cover portion 14 in a direction of their rotation axis X, which second distance B is larger than the first distance A, the cover 14 can be arranged onto the bolts 3 such that the cover 14 can be pressed towards the bar 1 and the body 2 before the nuts 15 are tightened. This measure facilitates a correct arrangement of the bar between the cover and the body.

When the cover 14 has been arranged onto the bolts 3 and the bar 1 is clamped towards the body 2 by the cover 14, the nuts 15 are tightened by threadingly engaging the nuts 15 to the bolts 3.

Figure 4:
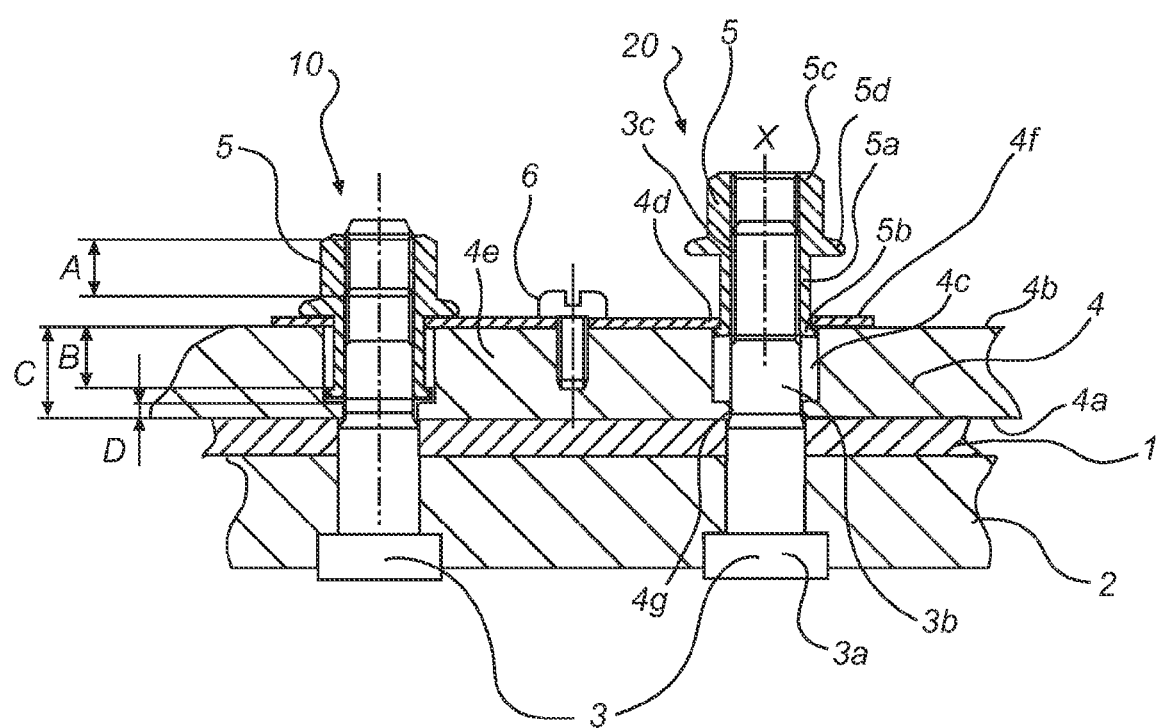
FIG. 4 is a cross sectional view of a second embodiment of the present disclosure.

An alternative embodiment of the present disclosure is shown in FIG. 4 wherein, as for the embodiment described with reference to FIGS. 1-3, a cover portion 4 clamps a guide bar 1 to a body 2 by means of a tightening arrangement, comprising two joints 10, 20. Each joint includes a first 3 and a second 5 engagement device. The first engagement device 3 is a bolt and the second engagement device 5 is a nut.

The joint 10 in the left part of FIG. 4 shows a state when the nut 5 is engaged to the bolt 3 so that the bar 1 is firmly clamped between the cover portion 4 and the body 2. The joint 20 in the right part of FIG. 4 illustrates a condition when the nut 5 and the bolt 3 are not engaged but the nut is captively connected to the cover portion 4.

In this second embodiment, the bolts 3 may be similar to the bolts described with reference to FIGS. 1-3. Each bolt has a first part 3a, securely attached to the body 2, and a second part 3b extending from the body through an aperture in the guide bar 1 and further through an aperture 4c,4g in the cover portion 4. The cover portion 4 has an inner surface 4a, directed towards the body, and an outer surface 4b, directed away from the body.

In contrast to the embodiment described with reference to FIGS. 1-3, a plate 4f is attached to the outer surface 4b of the cover portion by means of a screw 6. The second part 3b of the bolt extends through an aperture in the plate 4f. A threaded part 3c of the second bolt part 3b projects beyond the plate 4f, in a direction away from the cover portion 4. In order to clamp the bar 1 between the cover portion 4 and the body 2, the nut 5 is engaged to the threaded part 3c of the bolt 3, and tightened.

The nut 5 comprises an internally threaded body portion 5c for engaging the threaded part 3c of the bolt. The internally threaded body portion is provided with a flange 5d that is adapted to bear against the plate 4f when the nut 5 is tightened. To allow axial movement of the nut 5 in a direction of the nut rotation axis X, the nut also comprises an attaching portion 5a, formed as a neck, adapted to be inserted into the through aperture 4c, 4g of the cover portion 4. The neck projects from the body portion in the direction of the nut rotation axis X from the flange 5d and away from the body portion 5c. The neck 5a has a protrusion, 5b formed as a flange arranged at the end distal to the flange 5d. The protrusion 5b is adapted to co-operate with at least one edge 4d of the aperture of the plate 4f, the at least one edge defining a diameter of the aperture in the plate 4f, so that the nut remains captively attached to the cover portion 4. A nut 5 arranged in this way could rather easily be manufactured with low tolerances.

The aperture 4c, 4g in the cover portion has two parts; an inner part 4g closest to the inner surface 4a of the cover portion 4, and an outer part 4c closest to the outer surface 4b of the cover portion 4. The diameter of the inner part 4g is smaller than the diameter of the outer part 4c. The outer part 4c is arranged as a recess in the aperture 4c, 4g. More specifically, the diameter of the inner part 4g is equal to or slightly larger than the diameter of the second part 3b of the bolt and the diameter of the outer part 4c is equal to or larger than the diameter of the protrusion 5b of the nut neck 5a. The outer part 4c of the aperture 4c, 4g has a larger diameter than the inner part 4g for being able to receive the nut neck 5a with its protrusion 5b.

The inner part 4g, according to present embodiment, also functions as a guide for the cover portion 4. In chain saw configurations having break components, such as a break band for a kick-back guard (not shown), mounted in the cover portion it is important to obtain high precision in the position of the cover portion 4. As the cover portion 4 is mounted onto the bolts 3 of body 2 the inner part 4g of the aperture 4c, 4g gets guidance from the second part 3b of the bolt 3. The diameters of the second part 3b of the bolt 3 and the inner part 4g of the aperture 4c, 4g are preferably adapted to achieve a close fit and thereby a sufficient guidance in order to obtain a high precision in the position of the cover portion 4.

The diameter of the aperture in the plate 4f is slightly smaller than the diameter of the outer part 4c of the through aperture 4c, 4g of the cover portion 4, such that the edge 4d of the plate 4f aperture partly covers the opening of the aperture 4c, 4g in the cover portion 4.

When the nut 5 is loosened such that its threaded part is not engaged to the threaded part 3c of the bolt, as illustrated by joint 20 in FIG. 4, the nut 5 is still connected to the cover portion 4 because the diameter of protrusion 5b is slightly larger than the diameter of the aperture in the plate 4f.

In FIG. 4, reference A indicates a first distance, which is the length of threaded engagement between the bolt 3 and the nut 5, i.e. the distance in the direction of the nut rotation axis X that the nut 15 has to move in threaded engagement with the bolt 3 for firmly clamping the bar 1 between the body 2 and the cover portion 14. When the nut is not engaged to the bolt, the nut is engaged to the cover portion 4 such that the nut can move a second distance B relative the cover portion 4, in the direction of the nut rotation axis X. In FIG. 4, this second distance B is equal to the distance in the direction of the nut rotation axis X between the position of the nut 5 of the joint 10 in the left part of the figure and the position of the nut 5 of the joint 20 in the right part of the figure. The second distance B is equal to or greater than the first distance A, for allowing the nuts 5 to be loosened separately and independently of each other. Reference C indicates the thickness of the cover portion 4, i.e. a distance between the outer surface 4b and inner surface 4a of the cover portion.

The walls of the inner part 4g of the through aperture will function as a guiding means for guiding the bolt 3 towards the nut 5 when the cover portion 4 is lead on to the bolt 3 such that the bar 1 is clamped between the cover portion 4 and the body 2. Reference D indicates a length of the inner part 4g of the through aperture 4c, 4g in the cover portion 4 in the direction of the nut rotation axis X functioning as a guiding means, i.e. a guiding length.

According to an embodiment, the aperture in the plate 4f may be oblong having a smallest diameter similar to the diameter between the edges 4d of the plate 4f and a largest diameter larger than the diameter of the nut neck 5a at the protrusions 5b. Thereby, when the plate 4f is not attached to the outer surface 4b of the cover portion 4, it is possible to insert the nut neck 5a through the aperture in the plate 4f where the aperture has a diameter similar to or broader than the diameter of the nut neck 5a at the protrusions 5b, by tilting the nut 5 relative the plate 4f, before inserting the nut neck through the aperture in the plate 4f. When the plate is attached to the cover portion by means of the screw 6 such that the plate bears against the outer surface 4b of the cover portion 4, and the nut neck 5a extends into the aperture 4c, 4g, the nut 5 cannot be tilted and is thus captively attached to the cover portion.

In another embodiment, the aperture in the plate 4f may be circular having a diameter similar to the distance between the edges 4d of the plate. For making it possible to insert the nut neck 5a in the aperture of the plate 4f, the nut neck may have slots extending in the direction of the nut rotation axis X, the slots making the structure of the nut neck 5a resilient. Thus it will be possible to compress the nut neck 5a and to snap it through the aperture in the plate 4f. Once inserted, the nut neck 5a will revert to its original shape, and the nut 5 is captively connected to the plate 4f.

The plate 4f can be a separate plate or a part of an already existing part of the hand-held motor-driven tool, such as a spike or spike bumper of a chain saw.

Alternative embodiments of retaining the second engagement device are presented in FIGS. 5A, 5B, 6A and 6B. Like the above described embodiments, these embodiments allow the second engagement device to remain coupled to the mechanism for which it is for mounting engagement. These second engagement devices can be interchanged with the second engagement devices as described above.

FIG. 5A and 5B illustrate a second engagement device for securing the bar 1 (illustrated in FIG. 4) between the cover portion 4 (illustrated in FIG. 4) and the body 2 (illustrated in FIG. 4). FIG. 5A is a second engagement device 35 that can engage the engagement portion of the first engagement device 3 (illustrated in FIG. 4), such as a bolt, arranged on the body of a handheld motor driven tool. In FIG. 5A, the second engagement device 35 has an aperture for engaging the engagement portion of the first engagement device. Additionally, the second engagement device 35 has a flange along the outer perimeter of the second engagement device 35. For example, as illustrated in FIG. 5A, the second engagement device 35 is a nut, and the first engagement device is a bolt (not shown); however, one or ordinary skill in the art will appreciate that the second engagement device 35 can also be a threaded nut, a lock nut, a block having a hole, or any other device that can engage the engagement portion of the first engagement device to secure a bar of a hand-held tool to the body of the tool.

As illustrated in FIG. 5A, the second engagement device 35 includes a protrusion 38 extending from a bottom surface of the engagement device 35. In at least on embodiment, the protrusion 38 can have a uniform circumference or can have an angled or bevelled protrusion 38. For example, the protrusion 38 can be upwardly angled from the end closest to the flange to the end furthest from the flange. The illustrated second engagement device 35 includes an indentation 37 at the bottom surface of the engagement device 35. In FIG. 5A, the indentation 37 is a circular indentation between the hole and the outer edge of the second engagement device 35. The indentation 37 and the protrusion 38 are configured for captive attachment to a spring biasing member 30 illustrated in FIG. 5B.

FIG. 5B is an illustration of an exemplary spring biasing member 30 in accordance with the present disclosure. The spring biasing member 30 has an undistorted position and a distorted position. The undistorted position refers to the configuration of the spring biasing member 30 where the second engagement devices are in an engaged configuration with the first engagement devices. In the undistorted position the upper surface of the spring biasing member 30 is substantially in a single plane. In the distorted portion, at least one end of the spring is distorted from the undistorted position. For example, in the distorted position the first engagement device and the second engagement device are not fully engaged such that the spring biasing member has a shape which is different than the undistorted position. The spring biasing member 30 can be made of a flat sheet of spring steel, plastic, or any other material that permits the spring biasing member to have a distorted position and an undistorted position. The spring biasing member 30 illustrated in FIG. 5B includes a captive portion 39 at each end of the spring biasing member 30 for captive attachment with a second engagement device 35. As shown in FIG. 5B, the captive portions 39 each have a through-hole for receiving the second engagement device 35. In the particular embodiment illustrated in FIG. 5B, the ends of the spring biasing member 30 are curvilinear and have a substantially circular through-hole passing through the end. For example, the ends of the spring biasing member 30 can be substantially circular and can have a tab portion 33. The tab portion 33 can be configured for mating engagement with a tab receiving portion of the cover portion. In alternative embodiments, the mating engagement between the second engagement device 35 and the spring biasing member 30 so that the second engagement device 35 is held together with the spring biasing member but is allowed to rotate with respect to the spring biasing member 30. Additionally, the mating engagement is such that the second engagement device 35 can be removed and engaged with the spring biasing member 30 with some resistance.

In FIG. 5B, a linkage portion 32 is between each captive portion 39 of the spring biasing device 30. The linkage portion 32 includes a plurality of bends 34. For example, the bends 34 can form a zig zag shape, an S-shape, or an elbow in the linkage portion 32. While the illustrated spring biasing device 30 shows four bends 34, the spring biasing device 30 can include more or less than four bends 34, including zero bends.

In between the ends of the spring biasing member 30 and through the linkage portion 32 is a mounting aperture 31 for receiving an attachment mechanism (not shown) to secure the spring biasing member 30 to the hand-held tool. For example, the attachment mechanism can be a machine screw, a bolt, or any other suitable attachment mechanism for securing the spring biasing member 30 to the hand-held tool. As illustrated in FIG. 5B, the captive portion 39 and the linkage portion 32 are arranged such that the centers of the through-holes and mounting apertures are aligned on a same axis 36. Also shown in FIG. 5B, the linkage portion 32 and the captive portions 39 of the ends of the spring biasing member 30 are arranged such that the bends 34 are arranged symmetrically about the axis 36. Additionally, in the particular embodiment illustrated in FIG. 5B, a tab portion 33 is located on each captive portion 39 on opposite sides of the axis 36.

The exemplary embodiments of the second engagement mechanism 35 and the spring biasing member 30 illustrated in FIGS. 5A and 5B are captively attached via the through holes of the captive portions 39 at the ends of the spring biasing member 30 and the protrusion 38 and indention 37 of the second engagement mechanism 35. For example, the protrusion 38 is inserted through through-hole of the spring biasing member 30. In the particular embodiment illustrated in FIG. 5A, the protrusion 38 is angled such that its widest portion is furthest from the flange. Thus, when the protrusion is inserted into the through-hole of the spring biasing member 30, the widest portion of the protrusion 38 extends through the through-hole and engages the end of the spring biasing member 30 with the indentation 37 of the second engagement mechanism 35; thereby, the second engagement mechanism 35 is captively attached to and maintained in the second biasing member 30.

Comparing FIGS. 4 and 5A, the second engagement device 35 is arranged to move a first distance (A) along the engagement portion 3c of the first engagement device 3 in a direction of the rotation axis X of the second engagement device 35. As the second engagement device 35 is moved along the engagement portion 3c of the first engagement device in a direction of the rotation axis of the second engagement device 35, the bar 1 is secured between the cover portion 4, 14 and the body 2 of the hand-held tool. In at least one alternative embodiment in which the spring biasing member 30 includes tab portions 33 at the captive portions, the tab portions 33 engages a tab receiving portion on the hand-held tool, thereby locking the spring biasing member 30 during rotation during tightening of the second engagement device 35 with the first engagement device attached to the body 2 of the hand-held tool. Additionally, the spring biasing member 30 can be configured for removable engagement with the cover portion 4 of the hand-held tool. As mentioned herein, while the illustrated embodiments is shown in relation to the cover portion 4 of the hand-held tool, other locations and configurations of the mechanism as described herein are contemplated by this disclosure.

FIGS. 6A and 6B illustrate a second engagement device for securing the bar 1 (illustrated in FIG. 4) between the cover portion 4 (illustrated in FIG. 4) and the body 2 (illustrated in FIG. 4). FIG. 6A is a second engagement device 45 that can engage the engagement portion of the first engagement device 3 (illustrated in FIG. 4), such as a bolt, arranged on the body of a handheld motor driven tool. Similar to the second engagement device 35 illustrated in FIG. 5A, the second engagement device 45 illustrated in FIG. 6A, the second engagement device 45 has an aperture for engaging the engagement portion of the first engagement device and a flange along the outer perimeter of the second engagement device 45. Additionally, the second engagement device 45 is configured for captive attachment to spring biasing member 40 (illustrated in FIG. 6B). The second engagement device 45 differs from that in FIG. 6A, in that the second engagement device 45 includes a lip 48 extending from the bottom surface of the second engagement mechanism 45. In between the lip 48 and the bottom surface of the second engagement mechanism 45 is a groove 47. The lip 48 and groove 47 provide for the captive attachment between the second engagement device 45 and the spring biasing member 40. While the second engagement device 45 illustrated in FIG. 6A is a nut, one or ordinary skill in the art will appreciate that the second engagement device 45 can also be a threaded nut, a lock nut, a block having a hole, or any other device that can engage the engagement portion of the first engagement device to secure a bar of a hand-held tool to the body of the tool.

FIG. 6B is an illustration of an alternative embodiment spring biasing member 40. Similar to the spring biasing member 30 illustrated in FIG. 5B, the spring biasing member 40 as an undistorted position and a distorted position and can be of a flat sheet of spring steel, plastic, or any other material that permits the spring biasing member 40 to have a distorted position and an undistorted position. The spring biasing member 40 comprises a linkage portion 42, a captive portion 49 at a first end of the linkage portion 42, and a mounting aperture 41 at second end of the linkage portion 42. The spring biasing member 40 illustrated in FIG. 6B differs from that in FIG. 5B, in that the spring biasing member 40 has one captive portion 39. As illustrated in FIG. 6B, the captive portion 49 includes a curvilinear end for captive attachment with the second engagement device 45 (illustrated in FIG. 6A). For example, the curvilinear end can be substantially semi-circular in shape, substantially circular in shape, or otherwise curved in shape.

Another difference between the spring biasing member 35 illustrated in FIG. 5B and the spring biasing member 45 illustrated in FIG. 6B is that the linkage portion 42 extends between the mounting aperture 41 and the captive portion 49 of the spring biasing member 40. The linkage portion 42 can include two bends 44 between the mounting aperture 41 and the captive portion 49, as shown in FIG. 6B. While two bends 44 are illustrated, the linkage portion can have less than or more than two bends 44, including zero bends. In at least one embodiment, the captive portion 49 and the linkage portion 32 are arranged such that the centers of the captive portion 49 and mounting apertures are aligned on a same axis 46.

The exemplary embodiments of the second engagement mechanism 45 and the spring biasing member 40 illustrated in FIGS. 6A and 6B are captively attached via the curvilinear end of the captive portion 49 of the spring biasing member 40 and the lip 48 and groove 47 of the second engagement mechanism 45. For example, the curvilinear end captively attaches and fits around the groove 47 of the second engagement mechanism 45. The lip 48 engages the captive portion 49 of the spring biasing member 40, thereby, captively attaching the second biasing member 40 with the second engagement device 40 and maintaining the second engagement device 40 in place when the second engagement device moves along the engagement portion of the first engagement device.

The captive attachment between the second engagement device 35, 45 and the spring biasing member 30, 40 provides for easier handling when securing the bar of a hand-held motor driven tool to the body of the tool. Additionally, the second engagement device 35, 45 and the spring biasing member 30, 40 reduces the chances of losing engagement devices, such as nuts, during assembly and operation of the hand-held motor driven tool. The captive attachment between the second engagement device 35, 45, and the spring biasing member 30, 40 provides for free rotation after the second engagement device 35, 45 engages the engagement portion of the first engagement device (for example, the bolt). Furthermore, the shape, orientation, and material of the spring biasing member 30, 40 allows for the axial movement of the second engagement mechanism 35, 45 Thus, with the arrangement of the second engagement device 35, 45, the spring biasing member 30, 40, and the first engagement device secured to the body of the hand-held tool, axial movement of the second engagement device 35, 45 is provided when mounting or removing the second engagement device 35, 45 from the hand-held tool while reducing the possibility of losing the second engagement device 35, 45 when assembling and operating the hand-held tool.

Other embodiments of the present disclosure are also possible. For example, there could be only one bolt and one nut in the attaching arrangement.

Above, the tool is described as a chain saw. Although, the tool may be any kind of hand-held motor-driven tool in which a bar is clamped between a cover and a body, such as a hedge trimmer, clearing saw, trimmer, pole saw or a power cutter.

In the drawings and specification, there have been disclosed preferred embodiments and examples of the disclosure and, although specific terms are employed, they are used in a generic and descriptive sense only and not for the purpose of limitation, the scope of the disclosure being set forth in the following claims.

The invention claimed is:

1. Arrangement for attaching a bar of a chain saw to a body of the chain saw, the arrangement comprising:
    at least one first engagement device, having a first part, securely arranged to the body of the chain saw, and a second part extending from the body, the second part having an engagement portion for engaging a second engagement device;
    a cover portion adapted to bear against the bar such that the bar is arranged between the cover portion and the body;
    at least one second engagement device, wherein the second engagement device is adapted to engage the engagement portion of the first engagement device for securing the bar between the cover portion and the body, the second engagement device having a rotation axis;

the second engagement device is arranged to move a first distance along the engagement portion of the first engagement device, in a direction of the rotation axis of the second engagement device, for securing the bar between the cover portion and the body, the second engagement device is captively attached to a spring biasing member, wherein the spring biasing member has a distorted position for which the first engagement device and the second engagement device are not fully engaged.

2. The arrangement as recited in claim 1, wherein the spring biasing member has an undistorted position for which the first engagement device and the second engagement device are fully engaged.

3. The arrangement as recited in claim 1, wherein the spring biasing member has an upper surface that is substantially in a single plane in an undistorted position.

4. The arrangement as recited in claim 1, wherein said spring biasing member has a through hole for captive attachment to said second engagement device.

5. The arrangement as recited in claim 1, wherein the spring biasing member comprises a curvilinear end for captive attachment to said second engagement device.

6. The arrangement as recited in claim 5, wherein the curvilinear end is substantially semi-circular in shape.

7. The arrangement as recited in claim 1, wherein the spring biasing member is formed from a single flat sheet of spring steel.

8. The arrangement as recited in claim 1, wherein the spring biasing member is configured for removable engagement with the cover portion.

9. The arrangement as recited in claim 1, wherein the spring biasing member has a mounting aperture for receiving an attachment mechanism.

10. The arrangement as recited in claim 9, wherein the attachment mechanism is a machine screw.

11. The arrangement as recited in claim 9, wherein the mounting aperture is located at an opposite end of spring mechanism from the end captively engaged with the second engagement device.

12. The arrangement as recited in claim 9, wherein the mounting aperture is located between two ends of the spring mechanism.

13. The arrangement as recited in claim 1, wherein said spring mechanism comprises a captive portion and a linkage portion.

14. The arrangement as recited in claim 13, wherein the linkage portion has at least one bend.

15. The arrangement as recited in claim 13, wherein the captive portion is substantially circular.

16. The arrangement as recited in claim 15, wherein the captive portion comprises a tab portion.

17. The arrangement as recited in claim 16, wherein the tab portion is for mating engagement with a tab receiving portion of the cover portion.

* * * * *